United States Patent [19]

Scharfen

[11] 3,735,652
[45] May 29, 1973

[54] HEADSTOCK FOR TURNING MACHINES EQUIPPED WITH INDEXABLE CHUCKS

[75] Inventor: Hans Scharfen, Büderich, Germany

[73] Assignee: Paul Forkardt Kommanditgesellschaft, Dusseldorf, Germany

[22] Filed: July 30, 1970

[21] Appl. No.: 59,647

[30] Foreign Application Priority Data

Feb. 4, 1970 Germany..................P 20 04 940.5

[52] U.S. Cl. ..............................82/30, 82/3, 82/28
[51] Int. Cl. ...........................................B23b 19/02
[58] Field of Search..............................82/30, 28, 3; 29/38.2; 279/5

[56] References Cited

UNITED STATES PATENTS

| | | | |
|---|---|---|---|
| 2,255,170 | 9/1941 | Kelley | 82/3 X |
| 1,056,332 | 3/1913 | Hartness et al. | 82/28 X |
| 2,948,542 | 8/1960 | Leifer | 279/5 |

FOREIGN PATENTS OR APPLICATIONS

| | | | |
|---|---|---|---|
| 1,579,285 | 7/1969 | France | 82/30 |
| 1,022,123 | 3/1966 | Great Britain | 82/30 |

Primary Examiner—Leonidas Vlachos
Attorney—Walter Becker

[57] ABSTRACT

A headstock for turning machines having pressure fluid operable rotatable and indexable chuck means and stationary pressure fluid conveying means for conveying control fluid to said chuck means, in which in the housing of said headstock there are provided at least two spindles respectively connected to a chuck, said spindles being adapted to be driven by a common drive in a synchronous manner while for each spindle the pressure fluid conveying housing means for the respective chuck is arranged on the pertaining spindle between two roller bearings supporting the respective spindle.

5 Claims, 6 Drawing Figures

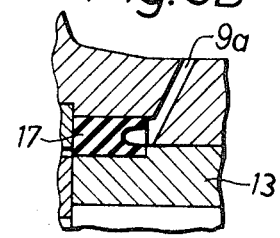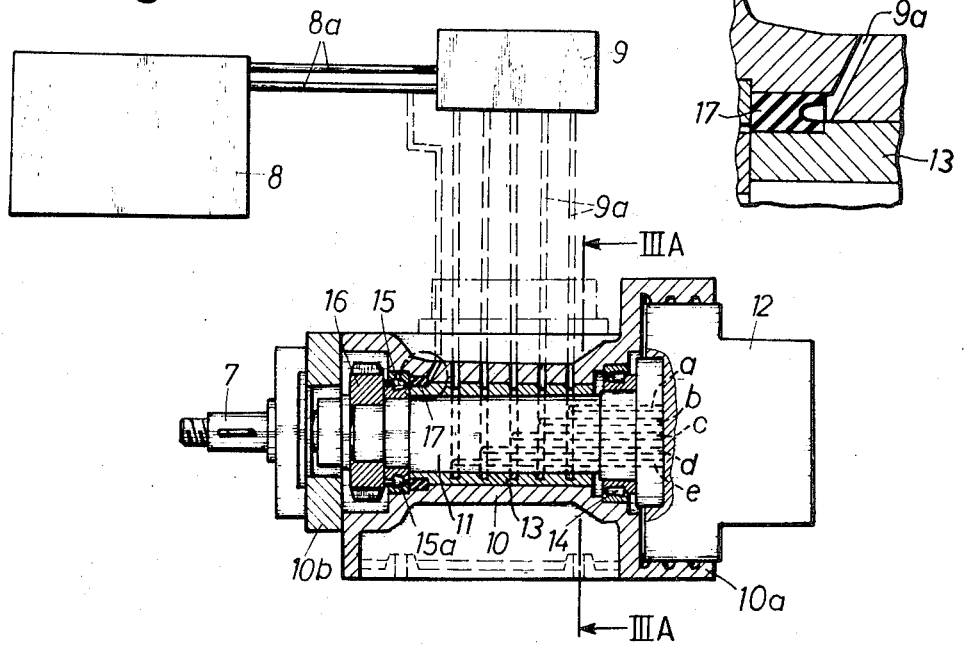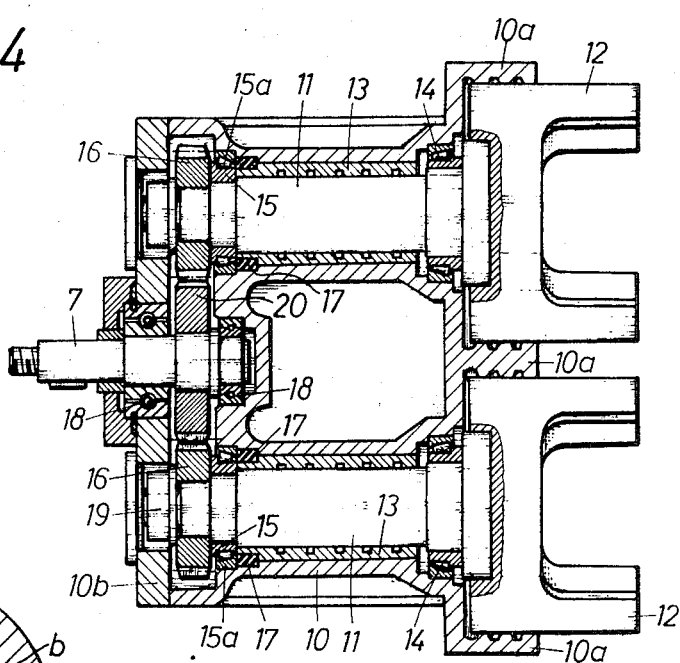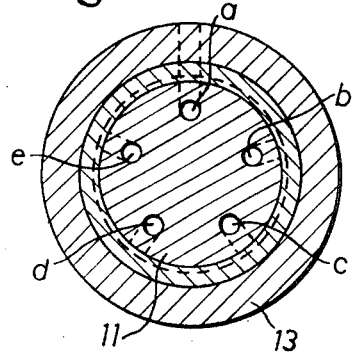

HEADSTOCK FOR TURNING MACHINES EQUIPPED WITH INDEXABLE CHUCKS

The present invention relates to a headstock for turning machines equipped with rotatable and indexable chucks for machining workpieces which are machined in one single chucked position in a plurality of positions of the clamping jaws of the chuck. The clamping mechanism and the indexing mechanism are actuated by pressure fluid which is conveyed to the indexable chuck through a stationary housing conveying the pressure fluid.

Turning machines have become known the spindle of which carries a indexable chuck the clamping jaws of which are adapted together with the chucked work pieces to be machined during the operation of the chuck successively to occupy different positions with regard to the axis of rotation so that the work piece can be machined from different sides while remaining clamped-in in one and the same position with regard to the chuck. In this way, it is possible to machine in particular cross links for universal joints. The clamping mechanism and the pivoting mechanism of the indexable chuck are actuated by pressure fluid which is controlled outside the spindle and which through a plurality of conduits at the rear end of the spindle is fed by means of a stationary pressure fluid conveying housing and is conveyed through a tube nest from the rear spindle end to the indexable chuck.

It is an object of the present invention to provide a head-stock for turning machines equipped with indexable chucks, by means of which the number of the work pieces to be machined simultaneously can be greatly increased without the necessity of changing the basic equipment of the turning machine or increasing the driving power therefor.

This object and other objects and advantages of the invention will appear more clearly from the following specification in connection with the accompanying drawings, in which:

FIG. 3 represents a vertical longitudinal section through a spindle of the headstock, said section being taken along the line III—III of FIG. 2.

FIG. 3A is a section along the line IIIA—IIIA of FIG. 3.

FIG. 3B is an enlarged showing of that portion of FIG. 3 which is located in the dot-dash circle IIIB.

FIG. 4 illustrates a horizontal longitudinal section through the headstock, said section being taken along the line IV—IV of FIG. 2.

Figure 1:
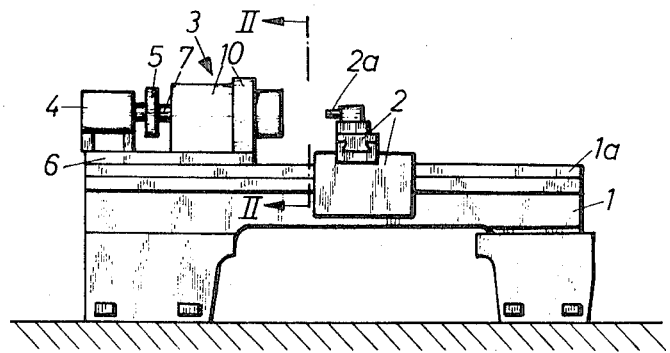
FIG. 1 is a side view of a turning machine equipped with a headstock according to the invention.

The headstock according to the present invention is characterized primarily in that in the pressure fluid conveying housing of the headstock there are provided at least two spindles respectively carrying a pivotable chuch which chucks are adapted to be driven synchronously by a common drive shaft. The headstock of the invention is furthermore characterized in that with each spindle, the pressure fluid conveying housing for the respective indexable chuck is arranged on the spindle between the two antifriction bearing means.

According to a further feature of the invention, the spindles are operatively connected through gears to a shaft which is directly driven by an electric motor, preferably an asynchronous motor. A hydraulic pump unit and a control unit are provided which are common for all indexable chucks.

In the turning machine art it is known, for purposes of duplicating work pieces which are to be machined simultaneously, to provide either so-called multi-spindle in-row turning automats which act as a plurality of one-spindle automats united in one machine frame, or so-called multi-spindle automats according to which a plurality of simultaneously chucked work pieces are successively fed to different tool groups. Inasmuch as with work pieces to be machined on indexable chucks always work pieces are involved with relatively low weight and extremely short machining time per control position, a machining of such work pieces on multi-spindle turning machines would require considerably longer control times than is the case when machining these work pieces on one-spindle turning machines by means of pivotable chucks. The indexing of the work piece in a indexable chuck will, in view of the small masses to be moved, require only a small portion of the time necessary for the indexing of the heavy spindle drum of a multi-spindle turning automat. By equiping heretofore known multi-spindle in-row turning automats with pivotable chucks, a multiplication of the work pieces to be machined on a turning machine would result, but such multiplication would require a change in the basic equipment with regard to a one-spindle turning machine.

In view of the suggestion according to the present invention, the masses of a spindle, which for a complete machining operation are to be accelerated and braked per work piece, are reduced to such an extent that the output of a commercial one-spindle turning machine will suffice to drive the from two to a maximum of five spindles of the headstock according to the invention. In view of their shortness and the short distance between the center of gravity of the pivotable chuck and the front bearing, these spindles have a relatively short diameter so that the driving and braking power to be employed per spindle is considerably lower. In view of the short spindle diameter, it is possible to arrange the stationary pressure fluid conveying housing between the two spindle bearings directly on the respective spindle because the circumferential speed of the spindle surface will, even at high speed of operation, not exceed the permissible sliding speed between the spindle and the pressure fluid conveying housing. Due to this arrangement of the pressure fluid conveying housing, the otherwise necessary spindle extension beyond the rear bearing becomes superfluous whereby a further stiffening or strengthening of the spindles will result.

Since all work pieces can be machined simultaneously and in the same direction and can by actuating the pivotable chucks also be controlled simultaneously, it is possible to arrange all tools on a common tool carriage so that only one driving device and only one copying device will be necessary for all tools.

In order to obtain a good seal against the entry of cooling water and chips from the working chamber into the headstock, it is furthermore suggested according to the invention to design the headstock housing with cylindrical extensions surrounding a part of the axial length of the pivotable chuck, said extensions being provided with turned-in portions for obtaining a sealing effect of a labyrinth seal.

The two antifriction bearings of each spindle are, according to a further feature of the invention, designed as inclined roller bearings while the outer ring of the rear roller bearing designed as loose bearing (Loslager) is under the load of a groove ring sleeve which is continuously under the pressure of the pressure fluid. In this way, while exploiting the respective pressure fluid, there will be obtained a spindle bearing system which is independent of temperature variations, is always free from play and is not under an overload.

The headstock may be designed as a structural unit and at its bottom side may be equipped with an intermediate plate which can be adapted to the dimensions of the guiding means for the respective machine bed when the headstock according to the invention is to be employed on a one-spindle turning machine with different bed design. In this way it is possible to convert commercial one-spindle turning machines in a simple manner into a special machine on which work pieces can be machined in one chucked position in a plurality of control positions of the jaws of a indexable chuck.

Referring now to the drawings in detail, FIG. 1 shows a turning machine with the headstock according to the present invention. The turning machine of FIG. 1 is provided with a machine bed 1 having guiding means 1a on which a tool carriage 2 carrying the tools 2a is displaceably mounted and which also carry the headstock 3 according to the invention. Headstock 3 has an intermediate plate 6 on which is fastened the electric motor 4 in addition to the headstock housing 10 proper. As will be seen from the drawing, the electric motor 4 is through an interposed brake 5 connected to the drive shaft 7 of the headstock 3.

Figure 2:
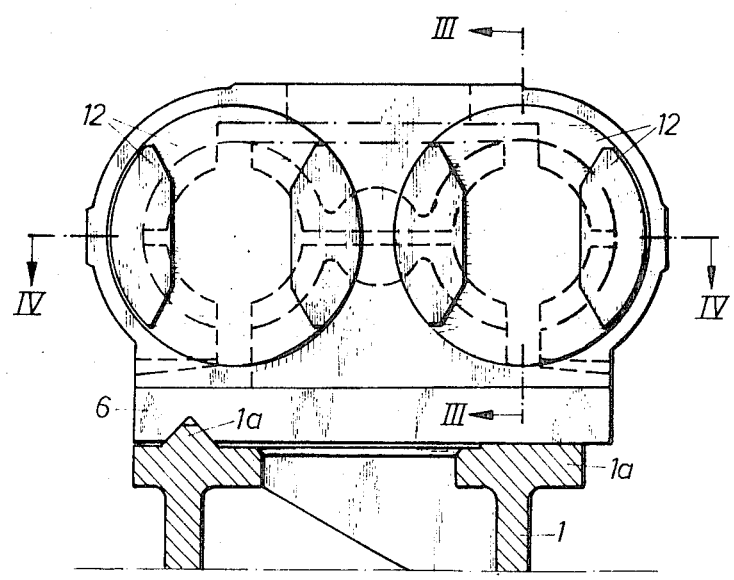
FIG. 2 illustrates on a somewhat larger scale than FIG. 1 a front view of a headstock according to the invention with a partial section through the machine bed, said section being taken along the line II—II of FIG. 1.

According to the embodiment illustrated in FIGS. 2–4, two spindles 11 are journalled in the housing 10 of the headstock 3. Each of the two spindles carries a rotatably indexable chuck 12. As will be seen from the drawing, the mounting consists of two antifriction bearings 14 and 15 each which are designed as inclined roller bearings. Between these two antifriction bearings 14 and 15 on each spindle 11 there is provided a pressure fluid conveying housing 13 by means of which the pressure fluid is conveyed from stationary control conduits 9a to the respective indexable chuck 12 which rotates also during its operation at the speed of the spindle 11. For both indexable chucks 12 there is provided a common hydraulic pump unit 8 and a single control unit 9 which is operatively connected to the pump unit 8 by means of pump conduits 8a because all work pieces clamped into the two chucks 12 are machined simultaneously and in the same direction and thus also the two rotatable chucks are indexed simultaneously.

As will furthermore be seen from FIGS. 3 and 3B, one conduit 9aa does not pass through control unit 9 but by-passes the same and leads directly from pump line 8a to the groove 17a equipped back side of sleeve 17. As will also be seen from FIGS. 3 and 3A, the lines 9a respectively lead into axis parallel lines a,b,c,d,e to the chuck 12.

The drive of the two spindles 11 is effected through the intervention of gears 16 which by means of special adjustable nuts 19 are connected to the respective spindle 11. The two gears 16 of the spindles 11 mesh with a gear 20 which is arranged on the drive shaft 7 between two bearings 18. One of these two bearings 18 is located in the housing 10 whereas the other bearing 18 is arranged in a cover 10b which closes the housing 10 on the drive side. The gears 16 and 20 are adapted to be exchanged by gears with a different number of teeth and with the same total of the pitch diameter in order to obtain different spindle speeds.

In order to assure a satisfactory seal of the front antifriction bearings 14 toward the outside, the housing 10 is provided with cylindrical extensions 10a which surround a portion of the axial length of the chuck 12. This is particularly evident from FIGS. 3 and 4. These extensions 10a are provided with grooved portions for obtaining the sealing effect of a labyrinth seal. In order to assure that, while taking advantage of the prevailing pressure fluid, a play-free journalling of the spindles 11 will be obtained independently of temperature variations and without overloading the antifriction bearings by too high a preload, the outer ring 15a of the rear antifriction bearing 15 designed as loose bearing is under the load of a groove ring sleeve 17 which is continuously exposed to the pressure of the pressure fluid and which produces a uniform preload in both anti-friction bearings. By interposing a pressure reducing valVe, this preload can be made adjustable in a simple manner.

It is, of course, to be understood that the present invention is, by no means, limited to the specific structure shown in the drawings, but also comprises any modifications within the scope of the appended claims.

What I claim is:

1. A headstock for turning machines having pressure fluid operated rotatable and indexable chuck means and pressure fluid conveying means for conveying control fluid to said indexable chuck means, which includes in combination: stationary headstock housing means including structure defining space forming part of said pressure fluid conveying means, at least two pairs of anti-friction bearing means, the bearing means of each pair being arranged in axially spaced relationship to each other and within said headstock housing means, a plurality of pressure fluid transfer housing means respectively arranged within said headstock housing means between the bearing means of the pertaining pair of anti-friction bearing means and also forming part of said pressure fluid conveying means and connected to said space in said headstock housing means, and a plurality of spindle means respectively at least two rotatably mounted in said pairs of anti-friction bearing means and also forming part of said pressure fluid conveying means, one end of each of said spindle means being connected to a chuck means, and the other end of said spindle means being connected to a common drive including gear means, an electromotor, drive shaft means driven directly from the electromotor, a hydraulic pump unit and control apparatus in common for all chuck means and for driving all of said spindle means synchronously.

2. A headstock in combination according to claim 1, in which said common drive includes dirst gear means respectively connected to said other end of said spindle means, second gear means centrally arranged with regard to said first gear means and in mesh therewith, and said electromotor means drivingly connected to said second gear means for driving the same.

3. A headstock in combination according to claim 2, in which said electric motor is an asynchronous motor.

4. A headstock in combination according to claim 1, in which said headstock housing means includes cylindrical extension means extending in the axial direction of said chuck means and covering a peripheral portion thereof.

5. A headstock in combination according to claim 1, in which said headstock forms a structural unit, and which includes plate means detachably connected to the bottom side of said headstock for adapting the same to the dimensions and configuration of different machine beds.

* * * * *